United States Patent [19]
Hunter et al.

[11] Patent Number: 5,842,427
[45] Date of Patent: Dec. 1, 1998

[54] APPARATUS FOR MOUNTING ON A TRACTOR OR OTHER VEHICLE AND PROVIDING OPPOSED MOVEMENT TO DIGGING OR LIFTING IMPLEMENTS

[76] Inventors: James Edward Hunter, R.R.#2, 1044 Hunter Lane, Oxford Station, Ontario, Canada, K0G 1T0; Ronald Harold Richardson, R.R.#4, Merrickville, Ontario, Canada, K0G 1N0

[21] Appl. No.: 964,156

[22] Filed: Nov. 6, 1997

Related U.S. Application Data

[63] Continuation-in-part of Ser. No. 629,065, Apr. 8, 1996, abandoned.

[30] Foreign Application Priority Data

Apr. 4, 1997 [CA] Canada .................................... 2201839

[51] Int. Cl.$^6$ .................................................. A01G 23/02
[52] U.S. Cl. ......................... 111/101; 37/302; 294/68.23; 294/88
[58] Field of Search ............................... 111/101; 37/302, 37/301, 187; 294/88, 68.23; 47/73; 414/625

[56] References Cited

U.S. PATENT DOCUMENTS

| | | |
|---|---|---|
| 3,191,982 | 6/1965 | Goalard . |
| 3,193,951 | 7/1965 | Beeson . |
| 3,558,177 | 1/1971 | Snead . |
| 3,618,234 | 11/1971 | Bates . |
| 3,775,876 | 12/1973 | May ........................................ 111/101 |
| 4,045,891 | 9/1977 | Grew . |
| 5,054,831 | 10/1991 | Ting et al. ........................... 111/101 X |
| 5,061,150 | 10/1991 | Rentschler ............................. 37/302 X |
| 5,081,941 | 1/1992 | Weeks ..................................... 111/101 |
| 5,129,336 | 7/1992 | Vos ......................................... 111/101 |
| 5,217,274 | 6/1993 | Ilchuk . |
| 5,485,691 | 1/1996 | Stevens et al. ...................... 111/101 X |
| 5,600,904 | 2/1997 | Bowling .............................. 111/101 X |
| 5,671,788 | 9/1997 | Rewis .................................... 37/302 X |
| 5,713,419 | 2/1998 | Kaczmarski et al. ............... 111/101 X |
| 5,715,614 | 2/1998 | Ookuwa et al. .......................... 37/302 |

FOREIGN PATENT DOCUMENTS 1125336  11/1984  U.S.S.R. ................................. 37/302

*Primary Examiner*—Michael J. Carone
*Assistant Examiner*—Christopher J. Novosad
*Attorney, Agent, or Firm*—Jones, Tullar & Cooper, P.C.

[57] ABSTRACT

Apparatus suitable for mounting on a tractor, and capable of providing opposed movement to a pair of cooperating implements suitable for digging or lifting. The apparatus has a frame with an upper central region and two laterally spaced lower regions, and two movable arms, each capable of holding one of the implements. Each arm has an inner end pivoted to the frame at one of the lower regions by a pivot which restricts movement of the arm, relative to the frame, to an inclined pivot plane, the pivot planes being situated to both slope downwardly and inwardly and meet at a line of intersection which is below and symmetrically between the pivots. A linkage arrangement is provided connecting the central upper region of the frame to each arm, and power cylinders are provided for moving the arms in their inclined pivot planes.

17 Claims, 8 Drawing Sheets

APPARATUS FOR MOUNTING ON A TRACTOR OR OTHER VEHICLE AND PROVIDING OPPOSED MOVEMENT TO DIGGING OR LIFTING IMPLEMENTS

CROSS-REFERENCE TO RELATED APPLICATIONS

This application is a continuation-in-part of our U.S. patent application Ser. No. 08/629,065, filed Apr. 8, 1996, now abandoned.

BACKGROUND OF THE INVENTION

1. Field of the Invention

The present invention relates to apparatus suitable for mounting on a vehicle, which may be a conventional tractor, the apparatus being capable of providing opposed movement to a pair of implements mounted on arms of the apparatus. The apparatus may be used with a variety of implements which may be interchangeable, and which will usually include digging and lifting implements.

2. Prior Art

The prior art of digging and transplanting equipment includes many fairly complicated, expensive, and specialized machines for performing particular tasks. Many of these machines require special vehicles which may be integral with the machine. However, some prior art devices can be attached to a conventional tractor, for example as described in the following patents:

U.S. Pat. No. 3,193,951, issued Jul. 13, 1965 to Beeson;
U.S. Pat. No. 3,558,177, issued Jan. 26, 1971 to Snead;
U.S. Pat. No. 3,618,234, issued Nov. 9, 1971 to Bates;
U.S. Pat. No. 4,045,891, issued Sep. 6, 1977 to Grew; and
U.S. Pat. No 5,217,274, issued Jun. 8, 1993 to Ilchuk.

The devices described in the above patents are relatively complex, usually involving several hydraulic cylinders, and are also somewhat specialised in their application. The present invention, by contrast, provides apparatus which is simple and inexpensive enough to be afforded by an average hobby farmer, which can be attached to various vehicles including a tractor having the conventional three-point hitch, or having other hitches, and which is adaptable to a wide variety of uses in addition to digging and transplanting small trees and shrubs. In one of its forms, the apparatus requires only a single hydraulic cylinder. The apparatus provides opposed movement to a pair of cooperating implements, which may be spade-type implements suitable for digging or transplanting, but which may also be implements suitable for lifting logs or brushwood, or for moving large stones; such implements are not confined to use in farming.

SUMMARY OF THE INVENTION

In accordance with the present invention, apparatus suitable for providing opposed movement to a pair of cooperating implements, comprises;

a frame having (when normally disposed) an upper central region and two laterally spaced lower regions;

two movable arms, each arm having an inner end pivotally mounted to the frame at one of said lower regions by a pivot; the pivots being such as to restrict movement of the arms, relative to the frame, to mutually inclined pivot planes oriented relative to the frame to slope downwardly and inwardly towards each other and to meet at a line of intersection which is situated below and symmetrically between said pivots, each arm having an outer end portion capable of carrying one of said implements, and power means for moving the arms to bring together implements carried thereby.

With the frame stationary and in its normal vertical position, the implements carried by the arms move in opposed, downwardly inclined paths preferably inclined at about 45° to the horizontal. This provides a useful motion for opposed digging implements which may each have a digging blade generally aligned with the path of movement, these blades moving towards each other and meeting along the line of intersection which will normally be aligned behind the tractor axis. Suitable blades moved in this manner will dig themselves into the soil without the need for substantial downwards force to be applied. The combined vertical and horizontal swinging motion provided in this invention by the orientation of the arm pivots is the kind of motion which in prior art devices would typically require simultaneous operation of two hydraulic cylinders acting in mutually perpendicular planes.

Another advantage of the kind of movement provided for the arms of this invention is that they allow digging implements to start from a wide spacing and to move inwardly and downwardly towards each other to a final position below the root of a tree, with little interference with its branches. By contrast, a typical prior art mechanism, such as that of the above-mentioned patent to Ilchuk, has rotatable clam-shell type digging elements mounted on fixed parallel arms extending at the level of tree branches, and such arms are apt to interfere with the branches of trees unless the trees are quite small.

In order to limit strain on the arm pivots, supporting links may be provided connecting the upper central region of the frame to each arm, each link having pivotal connection with the frame to allow the arm to be supported by the link over a range of movement. The link may be fixed to the respective arm and may be pivoted to the frame by a pivot aligned with the arm pivot. The connection between the link and the arm may alternatively include a pivot, preferably having some looseness as may be necessary to accommodate more complex relative motion. The links may each comprise part of a lever, the two levers being connected to opposite ends of a power cylinder for transmitting movement to the arms. Thus the apparatus may operate with a single power cylinder.

Alternatively, a separate power cylinder may be provided for each arm, each having an upper end attached to an upper side extension of the frame and each cylinder operating in the inclined plane of movement of the respective arm.

The frame may include pivot brackets, generally corresponding in position to the upper central region and the lower laterally spaced regions, for direct connection to a three-point hitch of a tractor. The conventional three-point hitch allows the frame to be lifted and lowered without tilting. However, a tilting movement of the frame may be desirable, and may be achieved by replacing the normal upper link of the hitch with a telescopic link, either manually adjustable or incorporating a hydraulic cylinder which controls its length. This allows the arms to have both the inclined pivoting movement about their pivots and also to have a vertical tilting movement provided by the tilting of the frame. The tilting motion may be so controlled that the implements carried by the arms move towards each other in a substantially horizontal plane while the frame is gradually tilted.

The frame, or at least a main central portion of the frame, is preferably triangular, having a base member and two equal-length side members, the central upper region and lower regions being at the corners of the frame, and the pivots carrying the inner ends of the arms are preferably aligned with the side members of the frame. These side members are preferably inclined at about 45° to the base member. In a variation, the frame may have extensions on each side of the main central portion, so as to be in the form of a "W" with upper and lower apices joined by horizontal members.

BRIEF DESCRIPTION OF THE DRAWINGS

Preferred embodiments of the invention will now be described by way of example with reference to the accompanying drawings, in which.

DETAILED DESCRIPTION

Figure 1:
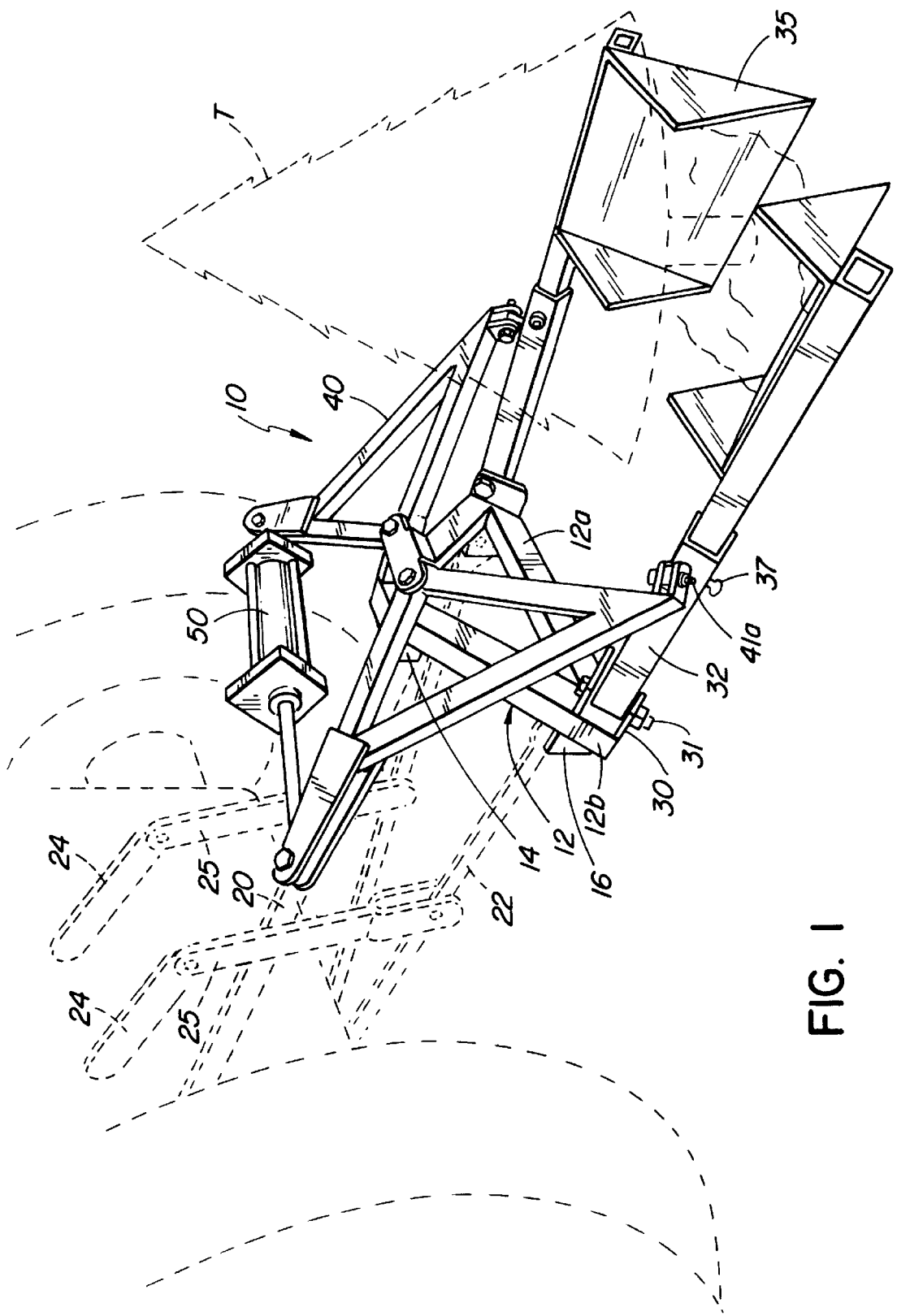
FIG. 1 shows a perspective view of a first embodiment of apparatus according to the invention attached to the rear of a conventional tractor.
Figure 3:
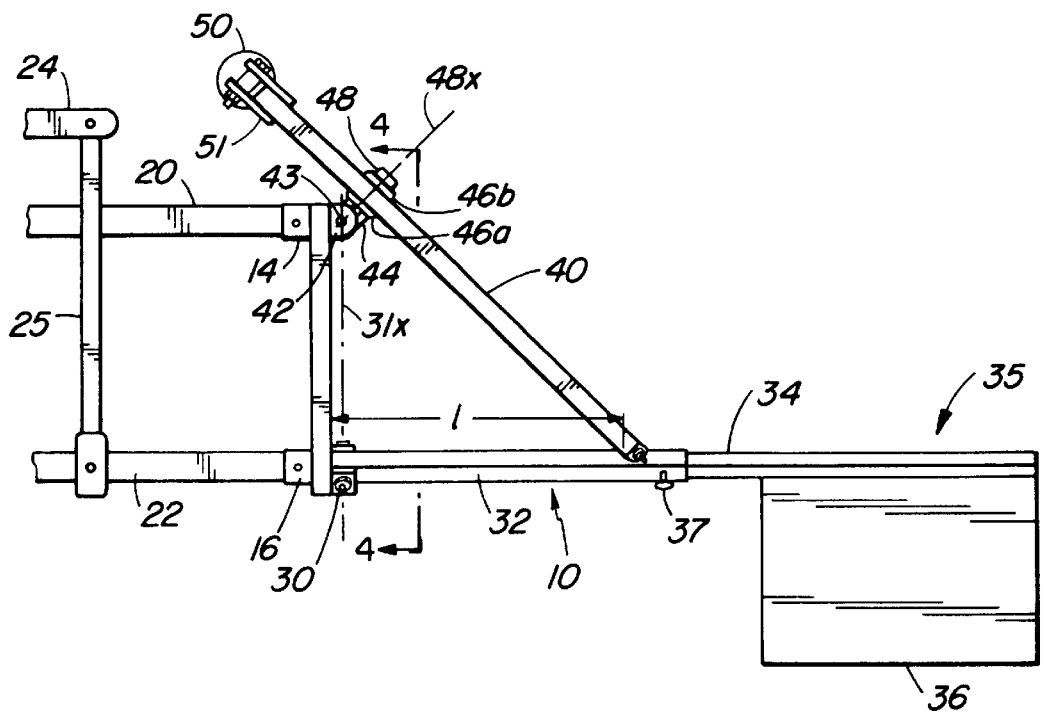
FIG. 3 is a side view of the same embodiment, also showing a portion of the tractor hitch.
Figure 4:
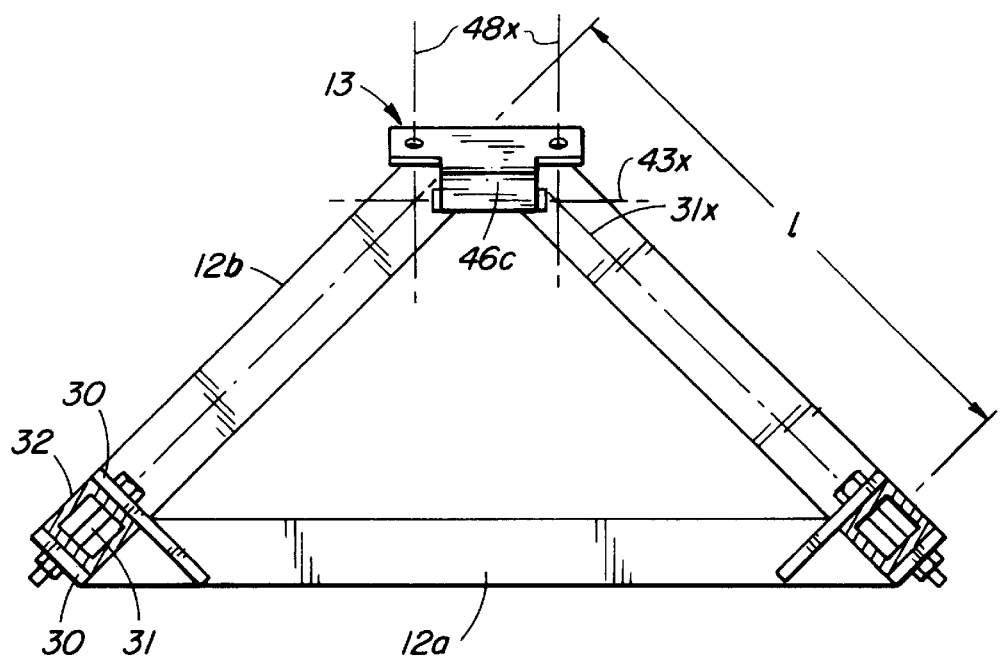
FIG. 4 is front view of the apparatus frame on lines 4—4 of FIG. 3, with some parts of the apparatus removed.

As shown in FIGS. 1 and 3, the apparatus 10 has a frame 12 adapted to be connected to a standard three-point tractor hitch, and which normally occupies a vertical plane. The frame 12, as best shown in FIG. 4, is formed of square steel tubing and has a horizontal base member 12a and side members 12b having their lower ends welded to the ends of the base member. The side members extend at 45° to the base member and meet at a right angled corner at the central upper region 13 of the frame. The corners of the frame are provided with brackets extending forwardly from the frame (i.e. towards the tractor) and having pivots for receiving the tractor hitch members. Specifically the upper corner of the frame has brackets 14 which pivotally connect to the upper link 20 of the hitch, while the lower corners each have a pair of brackets 16 which connect onto one of the two laterally spaced drag links 22 of the hitch. This type of hitch has lift arms 24 connected to the drag links 22 by lift links 25, and which can be used to raise the drag links and thus lift the frame 12 while keeping this generally vertical.

Each lower corner of the frame 12 also has a pair of rearwardly projecting brackets 30, each pair of these brackets having pivot bolts 31 supporting the inner end of an arm 32 formed of square tubing and extending rearwardly of the frame. As best seen in FIG. 4, these brackets 30 are arranged so that pivot bolts 31 are orientated along the axis of the frame side members 12b, i.e. are orientated at 45° to the normally horizontal base member 12a. Accordingly, the arms are restricted to swinging movement in pivot planes which are inclined at 90° to each other, and inclined at 45° to the normally horizontal frame member 12a, the planes meeting at a line of intersection which is situated below and symmetrically between the lower corners of the frame and perpendicular to the plane of the frame.

The arms 32 are of hollow square tubing, and an outer end portion of each arm provides a hollow recess into which may be inserted the square-sectioned stem 34 of an implement; for illustration there are shown digging/transplanting implements 35 of half-bucket form each having a main cutting blade 36 which slopes downwardly and inwardly so as to be generally aligned with the plane of movement of the arm. The stem 34 is retained in the arm 32 by removable pin 37.

Figure 2:
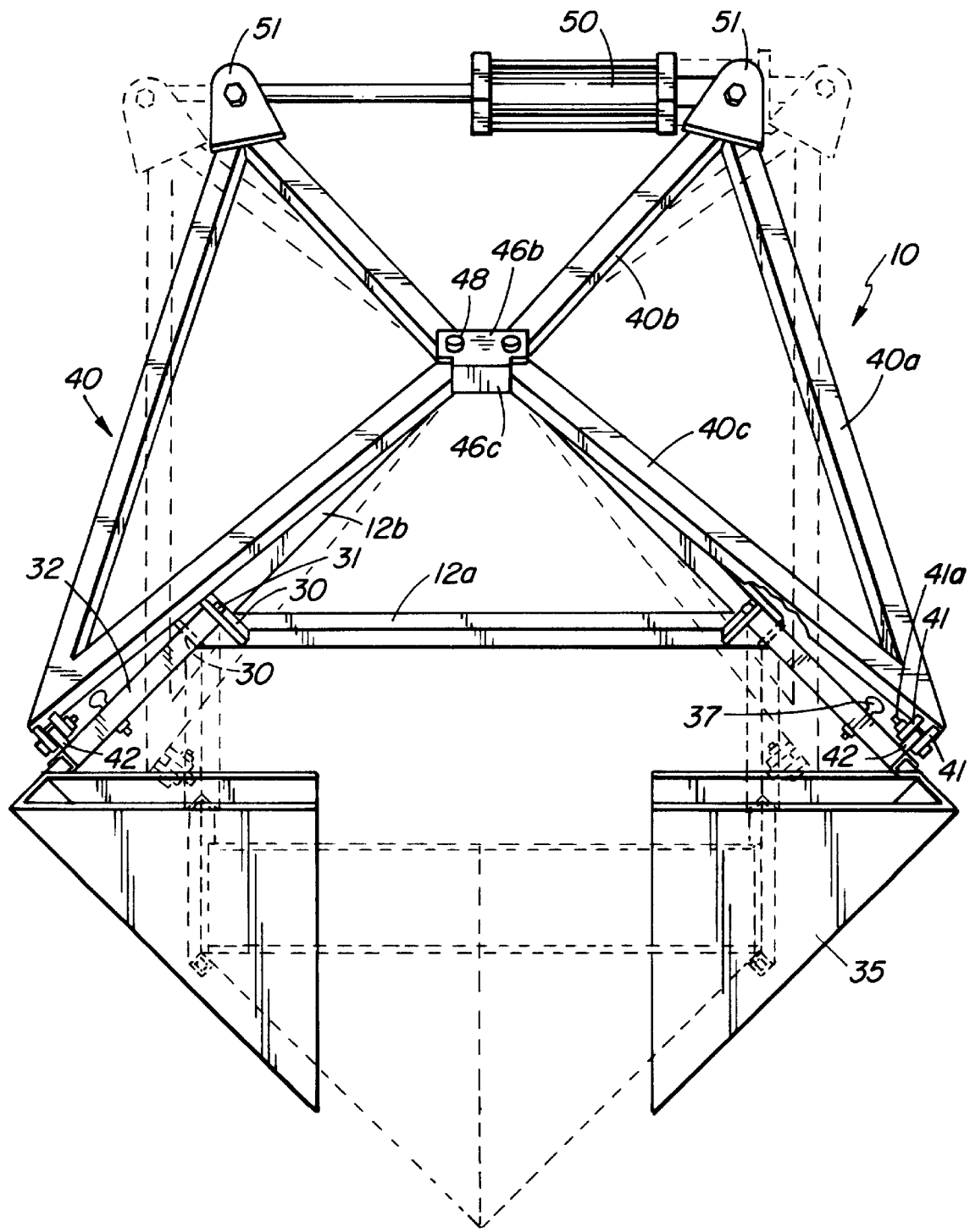
FIG. 2 is a rear view of the apparatus, detached from the tractor, looking downwardly at an angle while the frame is vertical.

The apparatus also includes a pair of levers 40, each of which serves to support and control the movement of one of the arms 32. Each lever has a triangulated structure including an outer strut 40a, and upper and lower links 40b and 40c respectively. The lower corner of each lever has a pair of downwardly and inwardly sloping lugs 41 which are connected by pivot 41a to a bracket 42 on the upper outer face one of the arms 32 at a location spaced well away from its inner end and preferably nearer its outer end. The lugs 41 allow some lateral movement, as well as slight twisting motion, of bracket 42 relative to the lugs. These levers are pivotally supported on the frame 12 adjacent its upper central region 13. The support includes a pair of lugs 42 projecting rearwardly from the region 13 of the frame and which carry a horizontal, transverse pivot pin 43 which in turn carries a tiltable bracket 44, the bracket including inner and outer plate portions 46a and 46b connected by a narrow web 46c. The inner and outer plate portions enclose adjacent inner corners of the levers 40, and the outer ends of these plate portions each carry a pivot bolt 48 for mounting the respective lever corner, these pivots being parallel and horizontally aligned. This arrangement allows the levers to act as links supporting the arms 32 and avoiding undue stress on the pivots 31. The levers also provide powered movement for the arms, by virtue of a hydraulic power cylinder 50 which is connected between brackets 51 extending from the upper corners of the levers. It will be clear that, with frame 12 stationary, extension of cylinder 50 acting on the levers 40 will cause the arms 32 and implements 35 carried thereby to move from a spaced apart positions along downwards converging paths to the close together positions shown in broken lines in FIG. 2, in which the arms 32 are approximately parallel and the lower ends of the implement blades 36 meet together.

In order for this pivot arrangement to operate without much binding, at least over a reasonable range of arm movement, say about 30° for each arm, the pivots are preferably arranged so that not only the pivot bolts 31, but also the pivots 41a, have axes oriented to pass through the upper central region 13 of the frame, and so that the axes of the lever pivots 43 and 48 pass close to this central region. In the preferred arrangement shown in FIGS. 3 and 4, the axes 31x of the pivots 31 meet the horizontal axis 43x of pivot 43 at spaced points which also lie on the axes 48x of the pivots 48, so that, at each side, the three axes meet at a point.

This embodiment, with the implements 35 as shown, is suitable for digging, or for transplanting a small tree, for example as shown at T in FIG. 1. The operation would be started with the cylinder 50 retracted to hold the arms spread apart with an angle of about 60° between them, and the tractor is positioned so that implements 35 are on opposite sides of the tree just above the ground. Cylinder 50 is then extended to move the arms downwards and together, with the blades of the implements digging into the earth and forming a V-shaped enclosure for the soil around the tree root. When the tree is suitably positioned in the implements 35, the lift arms 24 of the tractor hitch may be operated to lift the apparatus and with it the tree.

Normally, suitably shaped implements pull themselves down into the soil with little need of downwards pressure being applied. However, depending on the implements and the soil, a digging operation may require that the tractor hitch be equipped to maintain a downwards force on the apparatus. This downwards force may be provided for by a hydraulic cylinder which can be locked to prevent the apparatus frame from rising during the digging operation.

The apparatus shown is based on the use of right-angled triangles with equal length sides. For example, the frame sides 12b lie at 45° to the base 12a, and the length "1" of the side 12b is equal to the inner end portion of the arm 32 between the bracket 41 and the arm inner end, as indicated in FIG. 3, so that the frame side 12b, the inner end portion of the arm 32, i.e. inboard of the lugs 41, and link 40c form a triangle similarly proportioned to the frame 12. However, other proportions are possible, and the arms could be arranged to pivot at other angles to the horizontal; it is expected that useful results could be achieved with arms pivoting at angles between 25° and 50° to the horizontal.

Figure 5A:
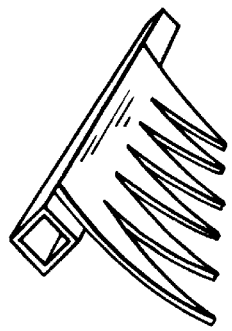
FIGS. 5a, 5b, 5c, and 5d are views of implements which may be used with the apparatus of this invention.
Figure 5A:
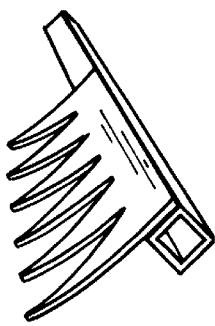
Figure 5B:
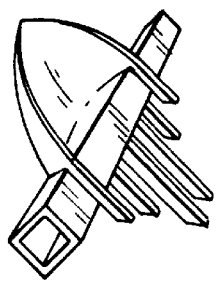
Figure 5B:
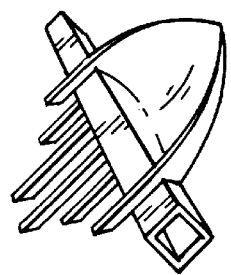
Figure 5C:
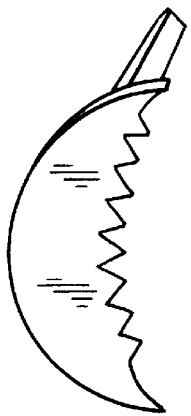
Figure 5C:
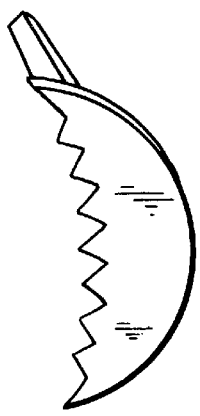
Figure 5D:
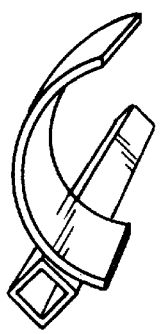
Figure 5D:
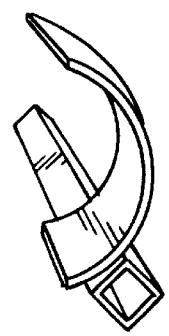

FIGS. 5a to 5d show alternative forms of implements which can be fitted into the arms 32 for particular tasks. FIG. 5a shows implements usable both for digging roots or for picking up rocks. FIG. 5b shows reversible implements which can be used in one orientation as forks, and in the opposite orientation as spades. FIG. 5c shows implements designed for grabbing the ends of logs, and FIG. 5d shows implements for gathering piles of brush, leaves, wood, etc.

Figure 6A:
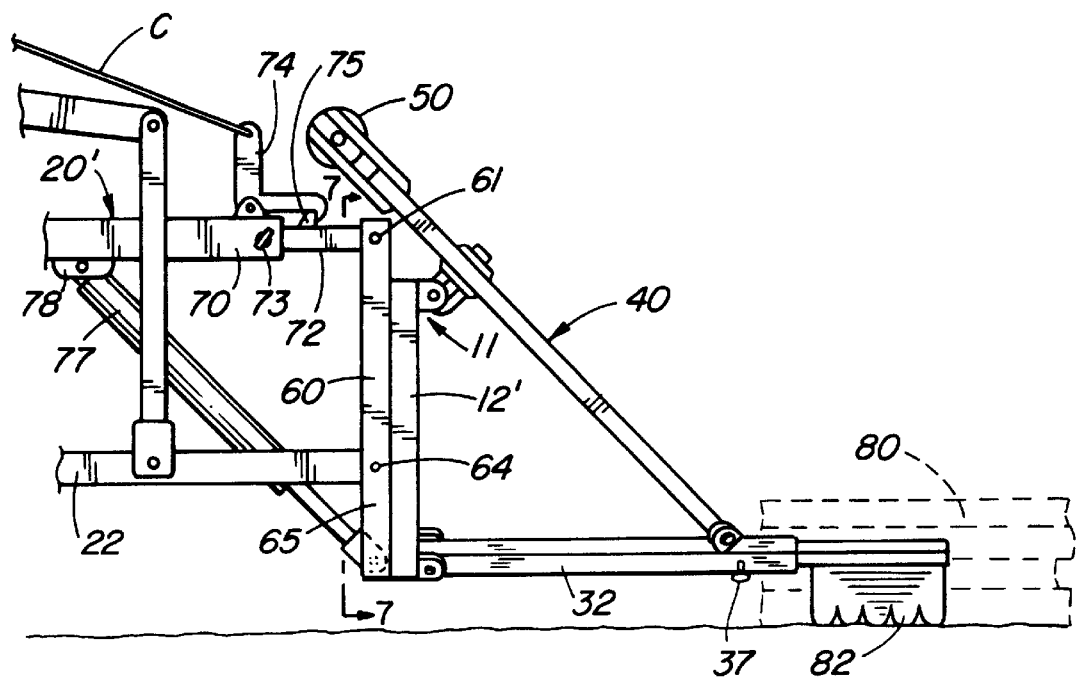
FIGS. 6a and 6b are side views of a second embodiment of the invention in successive positions.
Figure 6B:
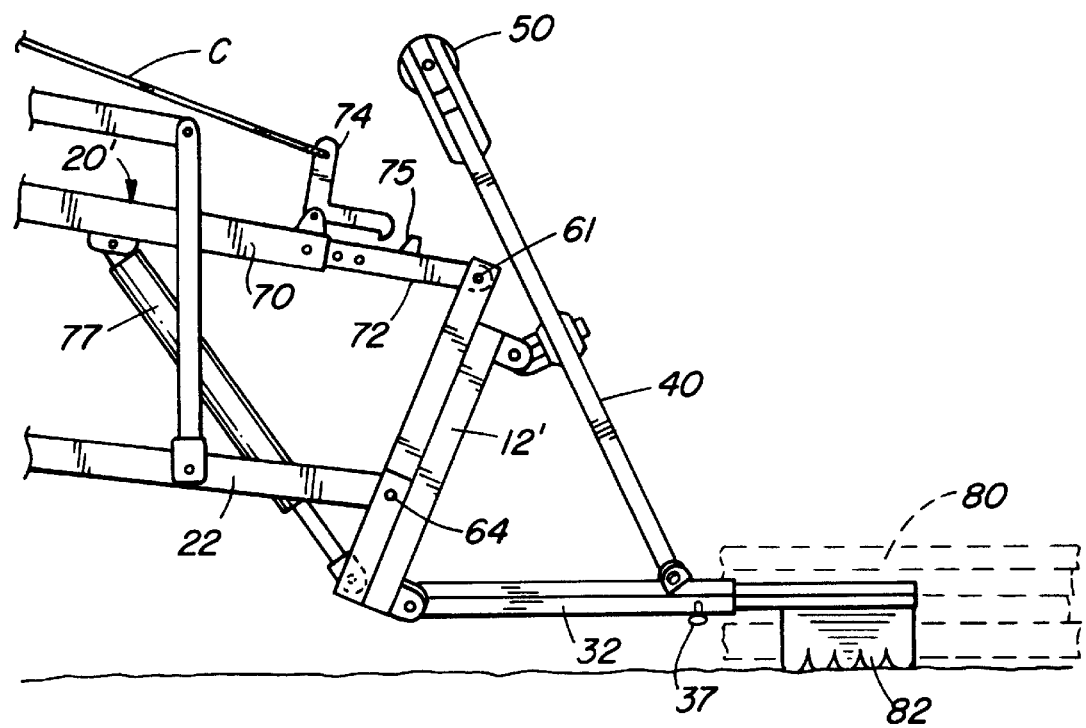
Figure 7:
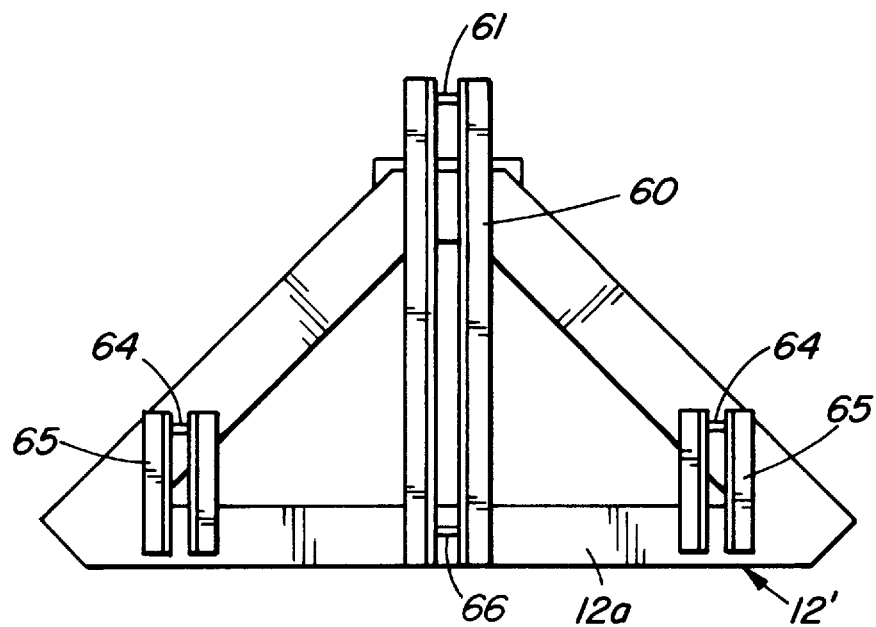
FIG. 7 is a view on lines 7—7 of FIG. 6a, showing the frame of the second embodiment, with movable parts of the apparatus removed.

FIGS. 6a, 6b, and 7 show a further embodiment of the invention which allows tilting of the frame and thus provides additional forms of movements of the arms, particularly useful where a gathering operation, rather than a digging operation, is required.

As before, the apparatus of this embodiment includes frame 12', similar to frame 12, the arms 32, and the levers 40, these being all the same as previously described except for the mounting means for the frame. Instead of the brackets 14 and 16 of the first embodiment, here the front face of the frame 12' has a pair of angle members 60 extending from the base member 12a up to above the upper corner of the frame, and supporting a cross pin 61 near their upper ends. Further pivot pins 64 are held at the sides of the frame, at about one-third the frame height, by lower brackets constituted by further pairs of angle members 65, these being spaced for receiving the ends of the drag links 22, and corresponding to brackets 16 of the first embodiment. The bottom center of the frame has an additional horizontal pin 66 held by the lower ends of the angle members 60.

The frame 12' is made tiltable by replacing the usual upper link 20 of the three-point hitch by a telescopic link 20' shown in FIGS. 6a and 6b. As shown, a simple form of telescopic link may have a relatively fixed part in the form of an outer square tube 70 which receives a relatively slidable part in the form of an inner square tube 72, the outer end of tube 72 being connected to pivot 61 while the usual drag links 22 are connected to the laterally spaced pins 64. The tubes 70 and 72 have matching holes for receiving a retaining pin 73 and which allow the link to be adjusted to various lengths. The retaining pin 73 can be removed to allow link to extend and the frame to tilt down about the pins 64. In addition, a spring operated latch 74 pivotally mounted on the upper outer end of the tube 72 is capable of automatically engaging a lug 75 projecting from the top of the tube 72. A hydraulic cylinder 77 is connected between a bracket 78 on the underside of tube 70 and the pivot pin 66 at the bottom center of the frame 12'.

As illustrated in FIGS. 6a and 6b, this arrangement is particularly useful when it is desired to pick up material such as bundles of wood 80 with implements indicated at 82 which are intended to slide along the ground rather than to dig in. The tractor is positioned, and arms 32 opened and lifted to straddle the material, while the frame 12' is held in the vertical orientation with latch 74 engaging lug 75. The latch can then be released remotely by a cable C, and cylinder 77 allowed to retract so that the frame tilts down to the position of FIG. 6b, with the implements 82 on the ground at each side of the material. Cylinder 50 is then operated to bring the arms together. As the implements 82 slide together, the frame 12' is caused to gradually tilt up and when the implements are in the required position the tubes 70 and 72 can be locked together with pin 73, after which the apparatus is lifted by the hitch lift arms 24 and material 80 is moved to a different location. If preferred, instead of locking the tubes with pin 73, the cylinder 77 can be extended to tilt the frame back to the vertical position at which the latch 74 engages lug 75.

The cylinder 77 can also act as a hold-down device for applying downwards force to the apparatus when this is needed for digging into hard ground. It will be evident that the use of the hydraulic cylinder 77 allows the frame 12', and therefore the arms 32, to be tilted in the vertical plane while cylinder 50 is inactive. This therefore increases the kinds of movement which can be provided for the arms 32.

A cylinder such as 77 can also be merely a passive, shock-absorbing type device for cushioning the tilting movement of the frame 12'. This allows the latch 74 to be released when the implements carried by the arms 32 are clear of the ground but have been positioned on opposite sides of a pile of material to be picked up from hard ground; in this case the cylinder will allow the frame 12 and parts it carries to tilt down gradually to the position shown in FIG. 6b. The frame is caused to tilt up to the vertical or near vertical position by inwards movement of the arms as the implements slide along a horizontal surface, and as before the frame can be locked in position by pin 73. A passive device of this kind can also be used as a hold-down device by locking it in its extended state.

Figure 8:
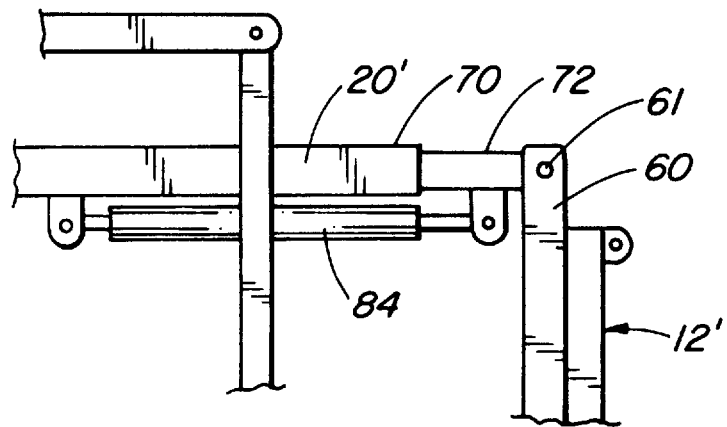
FIG. 8 is a fragmentary view of an alternative form of telescopic link.

FIG. 8 shows an alternative arrangement in which the telescoping movement of the tubes 70 and 72 is controlled by a hydraulic cylinder 84 having one end attached to each of the tubes. This allows complete control of the tilting action.

Figure 9:
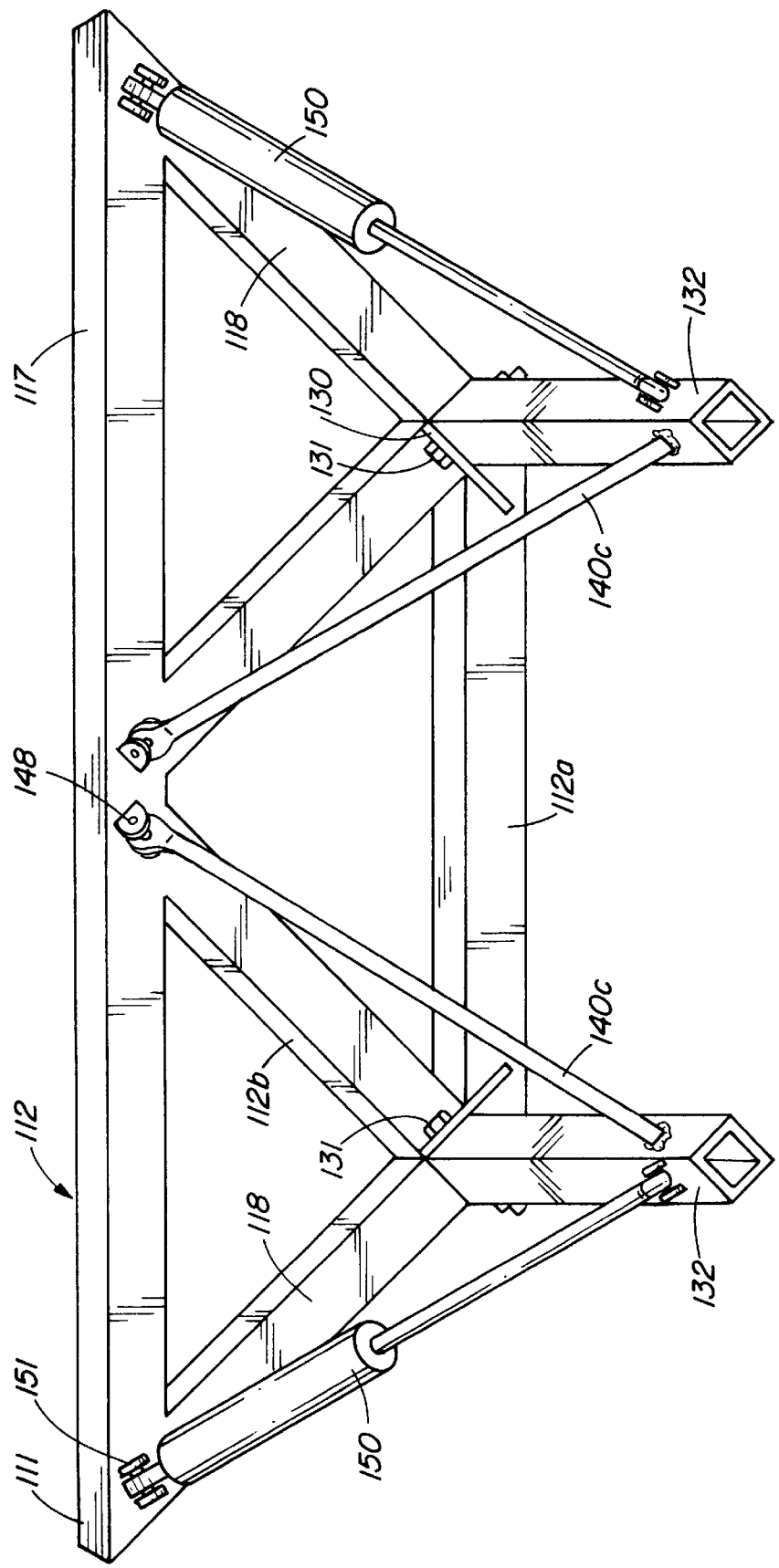
FIG. 9 is a rear perspective view of a yet another embodiment of the invention, without any implements.
Figure 10:
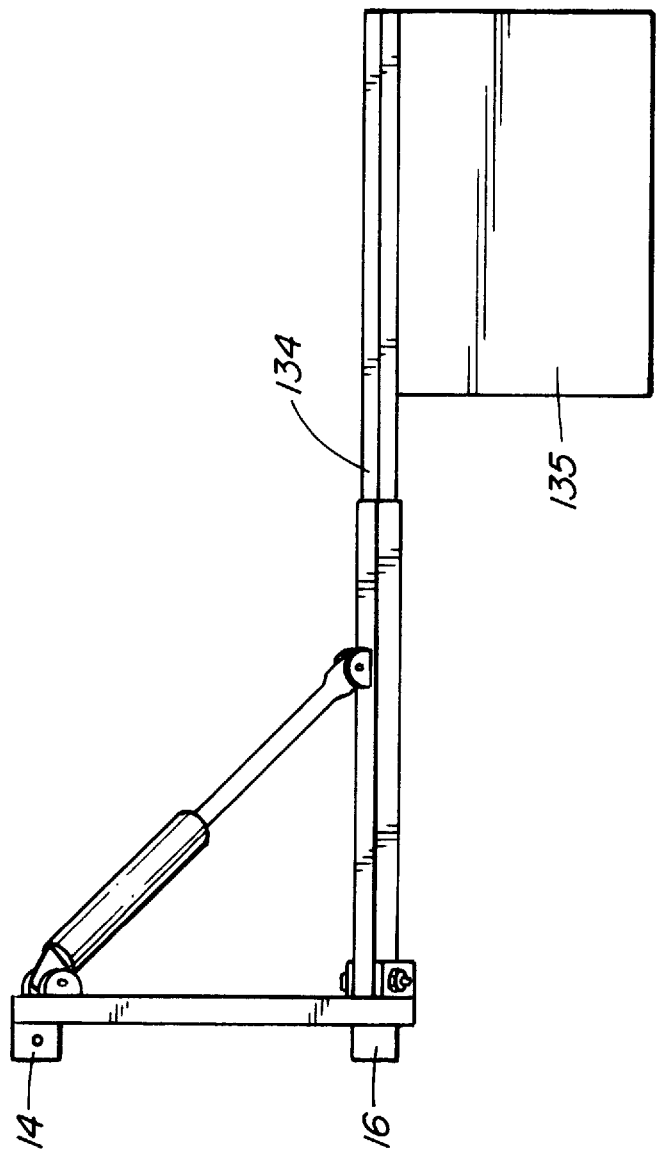
FIG. 10 is a side view of the FIG. 9 embodiment, showing digging implements in place in the arms.

FIGS. 9 and 10 show a yet another embodiment of the invention, which requires two hydraulic cylinders, and a wider frame, but which is otherwise simpler in construction.

Here, each arm 132 is powered by its own cylinder 150, although the cylinders will normally operate simultaneously. The cylinders lie in the 45° planes of movement of the arms, and have their upper ends connected to brackets 151 carried by the upper corners of side extensions of the frame, which corners are level with the upper central region of the frame. These extensions are provided by an upper horizontal member 117 and by downwardly, inwardly sloping frame members 118 extending at 45° to the horizontal, so that the whole frame is in the form of a "W" with its apices connected by upper member 117 and lower, base member 112a. The two lower corners of the frame carry the arms 132 on pivot pins 131 held by brackets 130 and which are aligned with the sloping inner frame members 112b, corresponding to members 12b of the first embodiment.

In this embodiment, the supporting linkage is much simplified compared to that of the first embodiment. It comprises, for each arm, a link or tie rod 140c having its outer, lower end welded to the arm 132, and having its inner, upper end pivoted to the central region of the frame by brackets 148 which carry pivots aligned with the main arm pivots 131. The tie rods 140c perform a function similar to that of the members 40c of the first embodiment, and prevent excessive strain on the pivots especially when the apparatus is used for lifting a load. As shown in FIG. 10, the frame has brackets 14 and 16 for connection to a tractor, as in the first embodiment, and can be moved by means similar to those described for the first embodiment. Operation is therefore similar to that of the first embodiment, the arrangement providing forceful movement of arms 132, which can hold implements 135 on stems 134 as shown in FIG. 10, in planes which slope downwardly and inwardly to a line of intersection which is situated below and between the pivots 131.

We claim:

1. Apparatus suitable for providing opposed movement to a pair of cooperating implements, comprising;
    a frame having an upper central region and two laterally spaced lower regions;
    two movable arms, each arm having an inner end pivotally mounted to the frame at one of said lower regions by a pivot, the pivots being such as to restrict movement of the arms, relative to the frame, to mutually inclined pivot planes oriented relative to the frame to slope downwardly and inwardly towards each other and to meet at a line of intersection which is situated below and symmetrically between said pivots, each said arm having an outer end portion capable of carrying one of said implements, and
    power means for moving the arms to move together implements carried thereby.

2. Apparatus according to claim 1, further comprising a pair of supporting links each connecting said upper central region of the frame to one of said arms, said links each having a pivotal connection with the frame to allow the arms to be supported by the links over a range of movement.

3. Apparatus according to claim 2, wherein said links each comprise a part of a lever, said levers being connected to opposite ends of a power cylinder for transmitting movement to said arms.

4. Apparatus according to claim 1, wherein said mutually inclined pivot planes are inclined at about a right angle to each other.

5. Apparatus according to claim 1, wherein said pivots have axes which, if extended, would pass through said upper region of the frame.

6. Apparatus according to claim 1, wherein said frame includes pivot brackets at the upper central region and at the two laterally spaced regions for connection to a three-point hitch of a tractor.

7. Apparatus according to claim 1, wherein said frame includes lower brackets pivotally connectible to lower links of a tractor three-point hitch, and an upper bracket connectible to part of the upper link of the three-point hitch in a manner which allows for tilting of the frame.

8. Apparatus according to claim 7, wherein power cylinder means are provided connected between said upper link and a point on said frame displaced from said lower brackets so as to be capable of tilting said frame about said lower brackets.

9. Apparatus according to claim 1, further including an implement attachable to each outer end portion of each arm in such a manner that each implement has a digging blade substantially aligned with the pivot plane of the respective arm when the frame is stationary.

10. Apparatus suitable for providing opposed movement to a pair of cooperating implements, comprising;
    a frame having an upper central region and two laterally spaced lower regions;
    two movable arms, each arm having an inner end pivotally mounted to the frame at one of said lower regions by a pivot which restricts movement of the arm, relative to the frame, to an inclined pivot plane, the pivot planes of said arms being situated relative to the frame so that when the frame is vertical both planes slope downwardly and inwardly and meet at a line of intersection which is situated below and symmetrically between said pivots, each said arm having an outer end portion capable of carrying one of said implements,
    two levers each having a central portion pivotally mounted adjacent to said central region of the frame, each said lever having a lower end portion pivotally connected to one of said arms at a location suitable for supporting each arm over at range of movement, said levers also each having an upper end portion, the upper end portions of the levers being connected to opposite ends of power cylinder means which, when being extended, pivots the levers to cause the arms to move together.

11. Apparatus according to claim 10, wherein said levers are pivotally mounted by means of side-by-side pivots carried by a plate itself pivotally mounted to the central region of the frame by a laterally extending pivot.

12. Apparatus according to claim 10, wherein said frame is triangular, having a base member and two equal-length side members, the central upper region and lower regions being at the corners of the frame, and wherein said pivots carrying the inner ends of the arms are aligned with the side members of the frame.

13. Apparatus according to claim 12, wherein the pivot planes extend at angles of between 25° and 50° to a horizontal plane passing through said base member.

14. Apparatus according to claim 10, wherein said side members are inclined at about 45° to the base member.

15. Apparatus suitable for providing opposed movement to a pair of cooperating implements, comprising;
    a frame having an upper central region, two laterally spaced lower regions, and two side extensions;
    two movable arms, each arm having an inner end pivotally mounted to the frame at one of said lower regions by a pivot which restricts movement of the arm, relative to the frame, to an inclined pivot plane, the pivot planes being situated relative to the frame so that when the frame is vertical both planes slope downwardly and inwardly and meet at a line of intersection which is situated below and symmetrically between said pivots, each said arm having an outer end portion capable of carrying one of said implements,
    two links each having an upper end pivotally mounted adjacent to said central region of the frame, each said link having a lower end portion connected to one of said arms at a location suitable for supporting each arm over a range of movement, and
    two power cylinders, each cylinder being connected between one of said arms and an upper part of one of said side extensions of said frame, and being capable of moving the respective arm through its range of movement.

16. Apparatus according to claim 15, wherein said frame is in the form of a "W", having upper apices connected by an upper horizontal member and lower apices constituting said lower regions and being joined by a base member, and wherein said pivots carrying the inner ends of the arms are aligned with members of the frame which join the lower regions to the upper central region.

17. Apparatus according to claim 16, wherein the pivot planes extend at angles of between 25° and 50° to a horizontal plane passing through said base member.

* * * * *